US012129993B2

(12) United States Patent
Diez

(10) Patent No.: US 12,129,993 B2
(45) Date of Patent: Oct. 29, 2024

(54) LAMP

(71) Applicant: Midgard Licht GmbH, Hamburg (DE)

(72) Inventor: Stefan Diez, Munich (DE)

(73) Assignee: Midgard Licht GmbH, Hamburg (DE)

( * ) Notice: Subject to any disclaimer, the term of this patent is extended or adjusted under 35 U.S.C. 154(b) by 0 days.

(21) Appl. No.: 18/281,195

(22) PCT Filed: Mar. 11, 2021

(86) PCT No.: PCT/EP2021/056176
§ 371 (c)(1),
(2) Date: Sep. 8, 2023

(87) PCT Pub. No.: WO2022/188978
PCT Pub. Date: Sep. 15, 2022

(65) Prior Publication Data

US 2024/0310028 A1 Sep. 19, 2024

(51) Int. Cl.

*F21V 21/16* (2006.01)
*F21S 6/00* (2006.01)
*F21S 8/00* (2006.01)
*F21S 8/04* (2006.01)
*F21V 21/30* (2006.01)
*F21V 21/32* (2006.01)

(52) U.S. Cl.
CPC .............. *F21V 21/16* (2013.01); *F21S 6/006* (2013.01); *F21S 8/036* (2013.01); *F21S 8/043* (2013.01); *F21V 21/30* (2013.01); *F21V 21/32* (2013.01)

(58) Field of Classification Search
CPC . F21S 8/043; F21S 8/036; F21S 8/068; F21V 21/32; F21V 21/14; F21V 21/16
See application file for complete search history.

(56) References Cited

U.S. PATENT DOCUMENTS 3,277,292 A * 10/1966 Horan ..................... F21V 21/32
362/430

FOREIGN PATENT DOCUMENTS

CN 204477788 U 7/2015
DE 8311055 U1 8/1983
(Continued)

OTHER PUBLICATIONS

International Search Report for patent application No. PCT/EP2021/056176, dated Nov. 30, 2021, 16 pages (not prior art).

*Primary Examiner* — Mariceli Santiago
(74) *Attorney, Agent, or Firm* — Lucian Wayne Beavers; Patterson Intellectual Property Law, PC

(57) ABSTRACT

A lamp includes a stand, a support attached to the stand, a holder attached to the support and a light unit attached to the holder. The light unit includes a light source facing away from the support. A floppy tension element is provided. A first attachment section couples the floppy tension element to the support or the holder. A second attachment section couples the floppy tension element to the holder or the light unit. The floppy tension element includes a tensioning section extending between the first attachment section and the second attachment section. At least one of the first and second attachment sections is adjustably positioned by at least one adjusting element such that at least one area of the holder between the support and light unit is brought into an arcuate state or the arcuate state of the at least one area of the holder is altered.

23 Claims, 12 Drawing Sheets

(56) References Cited

FOREIGN PATENT DOCUMENTS

Figures 1A, 1B, 1C, 1D:
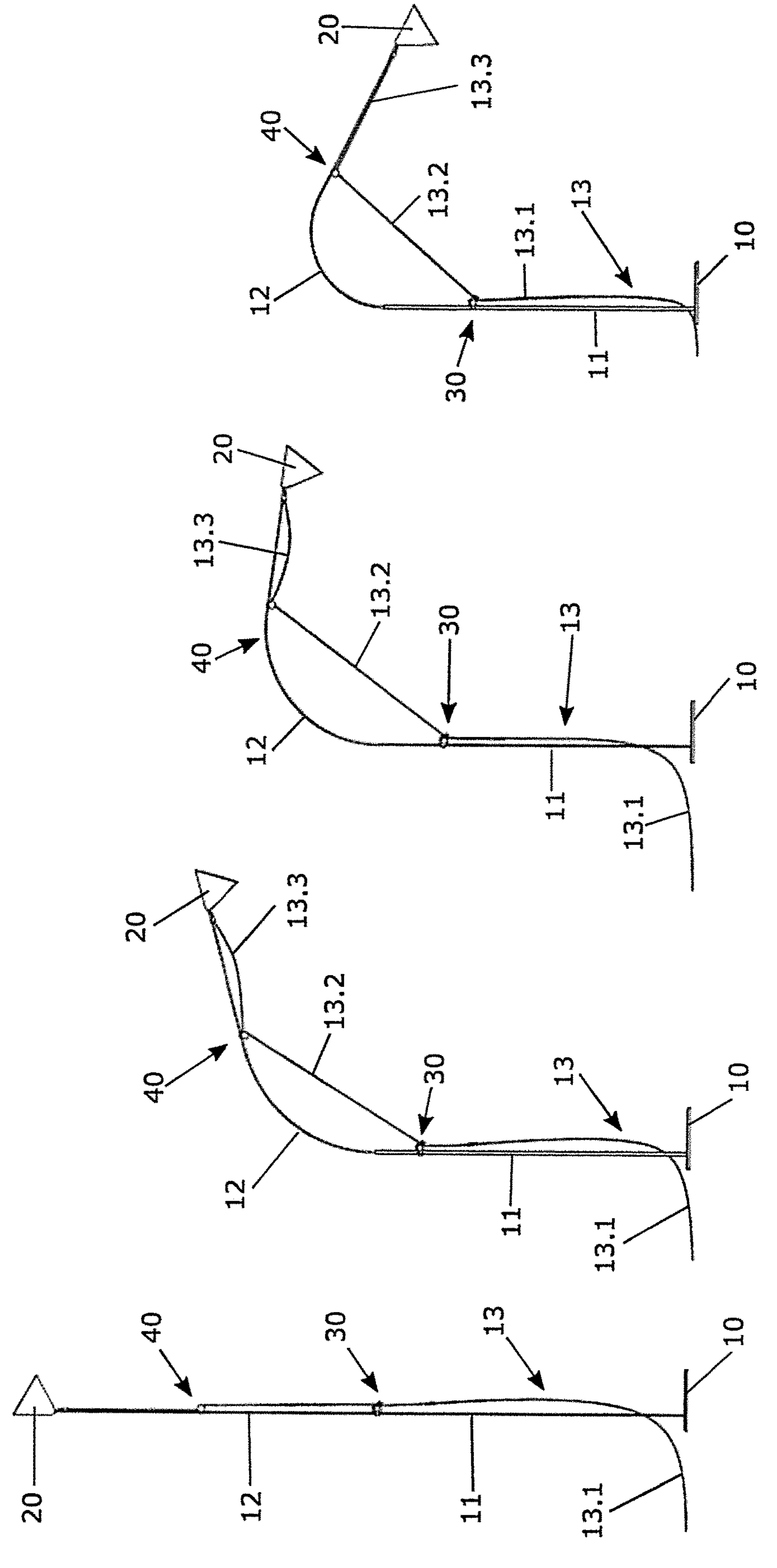

| | | | |
|---|---|---|---|
| DE | 8427141 | U1 | 1/1985 |
| DE | 8529195 | U1 | 1/1986 |
| DE | 8901191 | U1 | 7/1989 |
| DE | 4142954 | A1 | 7/1993 |
| DE | 102020100176 | B4 | 9/2021 |
| FR | 728434 | A | 7/1932 |
| JP | 55051873 | U | 4/1980 |
| KR | 20080088687 | A | * 10/2008 |

* cited by examiner

LAMP

The invention relates to a luminaire having a stand, to which a support is attached indirectly or directly, wherein a holder is attached to the support, wherein a light unit, which comprises at least one illuminant, is indirectly or directly attached to the holder facing away from the support.

From the prior art a multitude of luminaires is known that use an adjusting mechanism to direct the light and adjust the illuminants used. Most systems divide the luminaire frames into frame sections of different lengths, which are connected by different types of joints for adjusting the luminaire. The known systems work using counterweights, ball joints, swivel and tilt joints or other joints, which can be adjusted in particular by means of spring balancing. Screws are used to pull joints together, which thus auto-secure by pressure or friction. Especially these screwed joints have to be readjusted after some time to guarantee a consistently good securing. Especially for very big luminaires, securing the joints is difficult. Luminaires that are adjusted using counterweights have a limited range of motion and do not work in all luminaire typologies, for instance as ceiling or wall luminaires.

The invention addresses the problem of providing a luminaire of the type mentioned above, which can be used to achieve the orientation of the light unit reliably and simply.

This problem is solved by a luminaire according to the invention in that a floppy tension element is provided, which has a first attachment section and a second attachment section spaced apart from the first attachment section, in that the tension element has a first tensioning section between the first attachment section and the second attachment section, in that the tension element is coupled to the holder by the first attachment section and by the second attachment section to the support or the holder or the light unit, and in that at least one of the attachment sections can be adjusted by means of an adjusting element to bring at least one area of the holder, in the area between the support and the light unit, into an arcuate tensioning state or to alter an arcuate tensioning state of the holder.

The floppy tension element can be used to bring the flexible bendable holder into a state of tension or to hold it in such a state of tension, in which it takes on an arcuate shape. In the arcuate tensioning state, the holder has inherent tension that places tensile loads on the first tensioning section of the tension element between the two attachment sections. The inherent tension of the holder tries to adjust the holder from the clamped state to its original position in the unclamped state. The invention utilizes this effect to accomplish the orientation of the illuminant in a simple manner and without additional tools. The adjusting element can accordingly be used to set or alter the clamping state. For this purpose, the adjusting element can be adjusted to adjust or alter the arcuate shape of the holder. This adjustment can be performed without joints in the holder, i.e., orientating the illuminant with respect to the support is simple and reliable. Preferably, the length of the first tensioning section is secured between the two attachment sections, such that the arc shape can be varied solely by adjusting the one adjusting element or the adjusting elements.

Preferably, the adjustable adjusting element may be attached directly to the holder or the support. However, this need not necessarily be the case within the scope of the invention. Rather, indirect coupling to the holder or support can also be performed. It is also conceivable that the adjustable adjusting element is attached to another component of the luminaire, for instance to the light unit.

Preferably, however, provision is made for at least one of the attachment sections to be adjustable along the support or the holder. This makes it possible to influence the curved shape of the holder in the simplest way.

A particularly preferred variant of the invention is such that the first attachment section is adjustably connected to the support by means of the first adjusting element and the second attachment section is adjustably connected to the holder by means of a second adjusting element. By means of such an arrangement, the adjustment options for the illuminant can be increased. The tensioned arch area of the holder forms between the two attachment sections. If, for instance, the attachment section assigned to the holder is now adjusted (while the assignment of the attachment section to the support remains unaltered), then the arcuate length can be altered. The area of the holder that adjoins the second attachment section in the direction of the light unit can bounce into its relaxed position due to its inherent stress. If this second attachment section is now adjusted in the direction of the light unit, the arc length of the tensioned arc section is extended. The bounced area is shortened accordingly. This lowers the light unit.

Furthermore, the arc shape of the holder can be altered when the first attachment section is moved on the support by means of the first adjusting element. If in this case the assignment of the second attachment section to the holder remains unaltered, the bending radius of the holder in the tensioned arc area can be altered. Because the holder is preferably not bent relative to the holder, the arcuate length of the holder does not alter.

To reduce the design effort, provision may be made for the support to have a guide, on which the first adjusting element is adjustably guided and/or for the holder to have a guide, on which the second adjusting element is adjustably guided.

A particularly preferred variant of the invention is such that the support and/or the holder is formed by a profile section or that the support and/or the holder has/have a profile section. This makes for a simple manufacture. For instance, provision may be made for such a profile section to be simply cut to the desired length from a semi-finished product.

In such an arrangement, provision may be made in accordance with a variant of the invention for the first adjusting element to have a holding element having a mount by means of which the first adjusting element is held on the profile section such that it can be displaced in the longitudinal direction of the profile, for the first adjusting element to have a clamping section, which bears against the profile section, and for the first tensioning section of the tension element to be secured to an attachment section of the first adjusting element, wherein the attachment section is held spaced apart from the clamping section to form a lever arm.

The holding element thus forms a sliding guide with the mount, which facilitates adjusting the first adjusting element. The clamping section is used to secure the adjusting element in the desired position relative to the profile section, preferably continuously adjustable in the longitudinal direction of the profile. To adjust the adjusting element, the clamping connection can be released at the clamping section and then the adjusting element can be moved, wherein the profile section is guided in the mount of the holding element. The adjusting element is held securely in place by the first tensioning section of the floppy tension element engaging with the attachment section of the adjusting element. A force is introduced into the attachment section via the tensile stress acting in the first tensioning section. This force acts via the lever arm spaced apart from the clamping section. In this way, a moment of tilt is introduced into the adjusting element. This moment of tilt automatically secures the adjusting element to the profile section by means of the clamping section.

The same operating mechanism can also be provided for the second adjusting element in that the second adjusting element has a retaining piece having a mount by means of which the second adjusting element is held on the profile section such that it can be displaced in the longitudinal direction of the profile, in that the second adjusting element has a clamping section, which rests against the profile section, and in that the first tensioning section of the tension element is secured to an attachment section of the second adjusting element, wherein the attachment section is held spaced apart from the clamping section in order to form a lever arm.

A luminaire according to the invention may provide a first adjusting element having a mounting element at the clamping section. A clamping piece forms the first attachment section with the mounting element and the clamping section of the first adjusting element, wherein the clamping piece is detachably connected to the mounting element, preferably slid on. Similarly, a luminaire according to the invention may provide a second adjusting element, which has a mounting area at the clamping section. A clamping piece forms the second attachment section with the mounting area and the clamping section of the second adjusting element, wherein the clamping piece is detachably connected to the mounting area, preferably inserted into the mounting area.

An inclined guide surface can preferably be provided on the clamp and on the mounting element of the first adjusting element for a guided mounting of the clamp of the first adjusting element. During the mounting process of the clamp on the mounting element, the clamp is preferably pushed onto the mounting element wherein the inclined guide surfaces rest against each other. (However, other mounting methods are also conceivable) The inclined guide surface of the clamp slides along the inclined guide surface of the mount until a snapped-in end position is reached. Due to the gradient of the inclined guide surfaces, the cross-section of the first attachment section, which holds the floppy tension element, is continuously reduced during the sliding on of the clamp until the snapped-in end position is reached. The snapped-in position is ensured by the snapping of a spring-loaded snap lug, which is preferably integrally formed on the mounting element. The push-on motion of the clamp presses the snap lug of the mounting element against the mounting element until the snap lug enters a mounting area of the clamp. The mounting area of the clamp for the snap lug provides a snap flank against which the tip of the snap lug rests in the snapped-in position and, in a particularly preferred variant, a contact section against which the snap lug rests.

The length and gradient of the inclined guide surfaces of the clamp and the mounting element are defined by a first and a second clamping length. There, the first clamping length is formed at the edge of the mounting element, which is closer to the tensioning section of the floppy tension element, spaced apart and oriented transversely to the longitudinal extent of the profile section of the floppy tension element. In contrast to the first clamping length, the second clamping length is formed at the edge of the mounting element, which is spaced closer to the line section of the floppy tension element. The second clamping length is also oriented transversely to the longitudinal extent of the profile section of the floppy tension element. In a preferred embodiment, the second clamping length is longer than the first clamping length, wherein the clamping lengths on the mounting element extend from the end facing the snap lug toward the clamping section of the first attachment element. This creates a positive gradient that results in a continuous cross-sectional narrowing of the first attachment section when the clamp is installed.

Such an embodiment has the advantage of a more precise fine adjustment with regard to the position of the luminaire before it is finally secured in the first attachment section.

In a further embodiment according to the invention, the clamp of the first adjusting element may have an aperture to release the snap connection between the clamp and the mounting element and to disassemble the clamp. In particular, the aperture may extend from the contact section of the clamp to the outer wall of the component. Preferably, the aperture is to be provided at the level of the snap lug. By means of any object that is a match for the aperture, the snap lug can be easily pushed off the snap flank by the force of the matching object being pushed through the aperture until it meets the snap lug.

Likewise, the clamp of the second adjusting element provides a snap connection which is preferably designed to be removable. Accordingly, at least one engaging element is provided on the clamp of the second adjusting element, which engages positively with the molded mount of the second adjusting element. In a preferred design variant, two engagement elements are provided on the clamp of the second adjusting element, which are disposed on the outer face of the clamp and connected via a bar.

With the intention of optimizing the securing of the floppy element in at least one attachment section, ribs may be provided to effect an additional clamping effect. Preferably, the ribs protrude in the direction of the tension element. In a particularly preferred variant, the ribs are disposed in the area of the tension element guide, especially in the deflection area.

In one embodiment of the luminaire according to the invention, the mounts for the holder of the first and the second adjusting elements have a first and a second edge. The second edge is disposed on the clamping section spaced apart from the first edge in the direction of the longitudinal extent of the profile section, wherein in the clamped state the second edge is located on the opposite end of the profile section with respect to the first edge. As soon as the tensioning section of the floppy tension element is tensioned, a force is introduced into the attachment section, which tilts the adjusting element relative to the support. Thus, via the force introduced into the attachment section and via the lever arm of the spaced-apart clamping section, a moment of tilt is introduced into the adjusting element, which automatically secures the adjusting element to the profile section. This securing can be optimized by providing the first and the second edge as described. Due to the support being tilted in the holder, it rests on the first and the second edge, which causes a clamping effect. In particular, the provision of edges formed by a shoulder implements a cross-sectional narrowing of the mount.

In a particularly preferred embodiment, the first edge of the mount is formed along the contour of the mount by a shoulder, wherein a shoulder forms the second edge along the contour of the clamping section.

Likewise, provision may be made for the first edge of the first adjusting element to be disposed along the longitudinal extent of the profile section in front of the second edge, wherein the first edge of the second adjusting element is disposed along the longitudinal extent of the profile section behind the second edge.

For safe guidance of the adjusting elements, provision may be made for the first and/or the second adjusting element to have two guide elements disposed spaced apart from each other, between which the clamping section is disposed, and for the profile section to be guided between the guide elements and to rest on the clamping section. Preferably, the clamping section may be formed by a friction piece, such as a rubber pad or coating. In this way, a simple and secure force-locked securing of the adjusting element is possible, which does not come loose even if vibrations act on the luminaire.

For convenient operation of the adjusting elements, provision may be made for the adjusting element to be penetrated by a grip hole or to have grip surfaces on two opposite outer faces.

One conceivable variant of the invention is such that the floppy tension element bears a clamping piece on its outer circumference, which clamping piece is secured in a non-displaceable manner in the longitudinal direction of the tension element, and that the clamping piece is secured to the attachment section of the adjusting element. The clamping piece can be formed by a separate component that is clamped, for instance pressed, to the tension element. In this way, a simple and positionally stable assignment of the clamping element to the tension element is achieved. Preferably, a metal sleeve, especially preferably an aluminum sleeve, is used as the clamping element, which is pushed onto the tension element and pressed to the tension element at the desired location. In this way, a small number of parts can be achieved.

To achieve a compact design for the adjusting element, provision may be made for the adjusting element to be penetrated by a tension element guide, which preferably has a deflection area, in which the tension element is deflected by a transition section.

For instance, the design can be such that an area of the floppy tension element is guided close to the support or holder. The deflection area is used to space the second area of the floppy tension element, which adjoins the adjusting element, further apart from the support or holder. This distance area can then be assigned to the first tensioning section, for instance. This arrangement allows the force to be applied spaced apart from the longitudinal axis of the support or holder, to easily manage the bending of the holder.

If the deflection area is appropriately designed, at least part of the tensile force of the first tensioning section in the deflection area can also be transferred to the adjusting element, similar to a strain relief in a cable.

A particularly preferred variant of the invention is such that the floppy tension element is formed by a power cable to which the light unit is electrically connected. In this way, the tension element has a dual function. On the one hand, it is used to adjust the holder. On the other hand, it is used to conduct current. This significantly reduces the amount of parts and assembly required for the luminaire.

A luminaire according to the invention can also be characterized in that the support is formed by a hollow section, into which the holder is inserted. This facilitates the assembly of the luminaire. In addition, this achieves a slim design, which increases the attractiveness of the luminaire.

Particularly preferably, provision may also be made for the holder to be held in the hollow section in such a way that the holder can be rotated relative to the hollow section about the longitudinal axis of the support. A swivel bearing is formed via this option for rotation. In this way, the light unit can be swiveled together with the holder, which further increases the adjustment options of the light unit.

Particularly preferably, the hollow section has a hollow cylindrical inner mount whose central longitudinal axis extends in the longitudinal direction of the hollow section. Accordingly, the holder may further preferably have a cylindrical outer cross-section at least in the area of connection to the support. By assigning the cylindrical outer cross-section to the hollow-cylindrical inner seat, the rotary bearing between the support and the holder can be implemented. Of course, it is also possible to use other cross-section combinations that permit the holder to rotate relative to the support.

A preferred variant of the invention is such that the holder is formed by a bending rod, which preferably has a circular cross-section and particularly preferably is made from solid material. The use of a circular cross-section permits the holder to be mounted in any position. In addition, this measure can also be used to implement such luminaires where the holder cannot be bent about one axis alone, but about different axes. For instance, provision may be made for the attachment section of the floppy tension element to the holder and/or support to be adjustable about the central longitudinal axis of the holder/support. This then also alters the bending axis for the holder and thus also the orientation of the illuminant.

If the holder is made of a solid material, such a holder forms a sufficiently high resetting force and it is also available at a low cost.

According to a preferred embodiment of the invention, provision may also be made for the holder to be made of a plastic material, preferably a glass fiber reinforced plastic. These materials have a low specific weight, which is advantageous for the design of the luminaire.

The use of a holder made of glass-fiber-reinforced plastic also results in a high elongation at break, such that high degrees of deformation are possible during arc formation. In addition, this material is also characterized by high elastic energy absorption but a relatively small modulus of elasticity. This results in high resetting forces that can be achieved during deformation with little effort.

A luminaire according to the invention can be such that the light unit has an attachment piece that has an attachment mount for the end of the holder. In this way, the holder can be easily connected to the light unit. Particularly preferably, a plug-in mount is provided for the holder. The end of the holder can be inserted into the plug-in mount and attached therein.

In addition or alternatively, provision may also be made for the floppy tension element to be attached to the attachment piece. This is particularly advantageous if the floppy tension element is designed as a power cable which supplies the illuminant with power. In particular, the floppy tension element can then be held on the attachment piece in a tension-relieved manner.

If provision is made for the light unit to have a swivel bearing, which can be used to alter the angular position of the illuminant relative to the holder, further adjustment options for the light unit can be implemented and thus the application options can be expanded.

Figure 3:
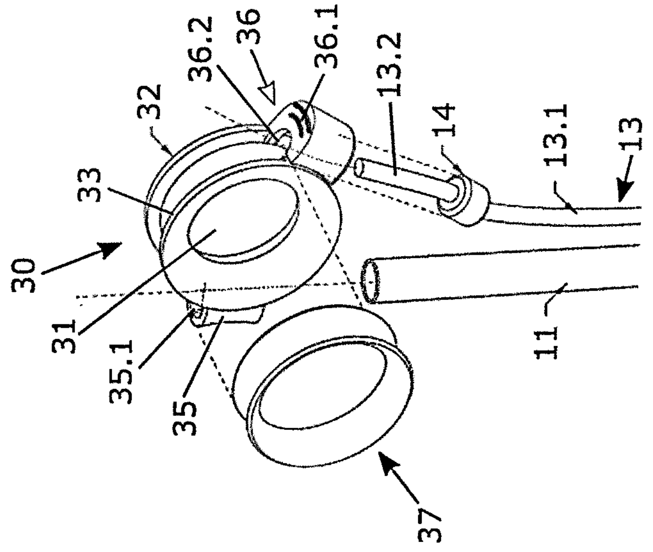
Figure 4:
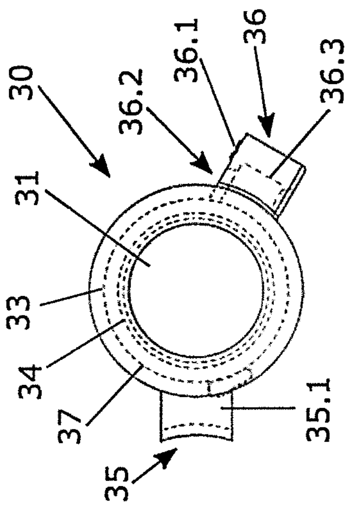
Figure 5:
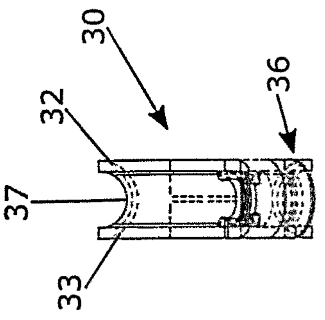
Figure 6:
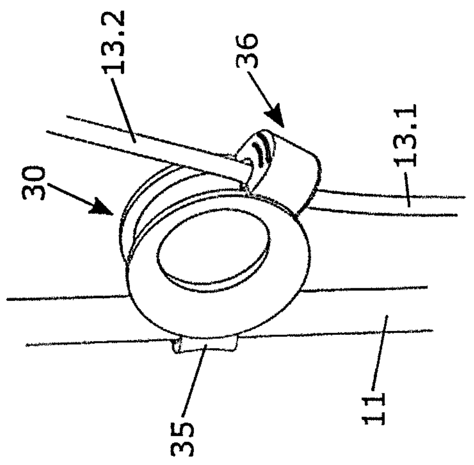
Figure 10:
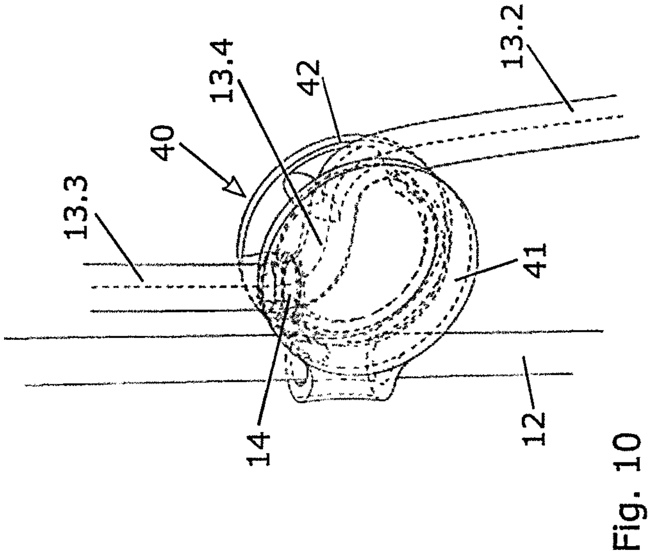
Figure 8:
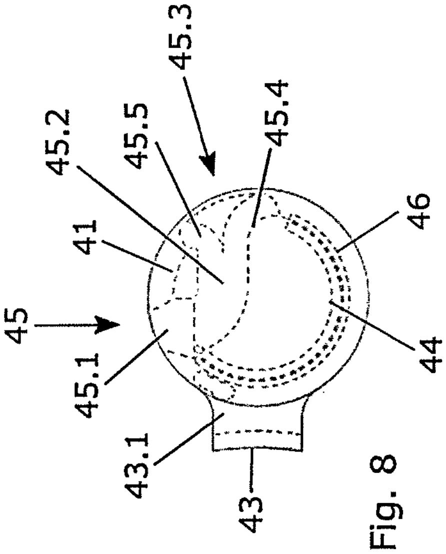
Figure 9:
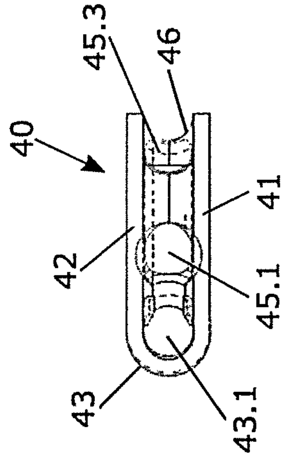
Figure 7:
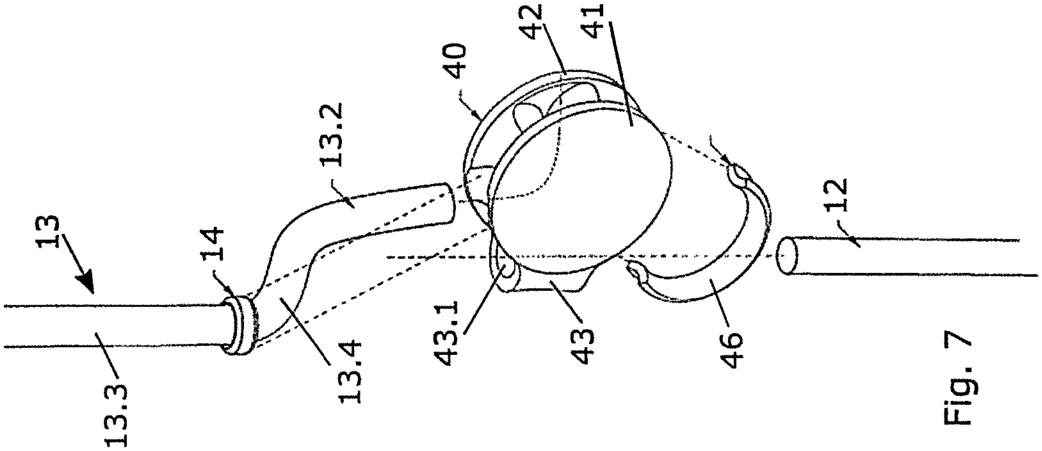
Figure 12:
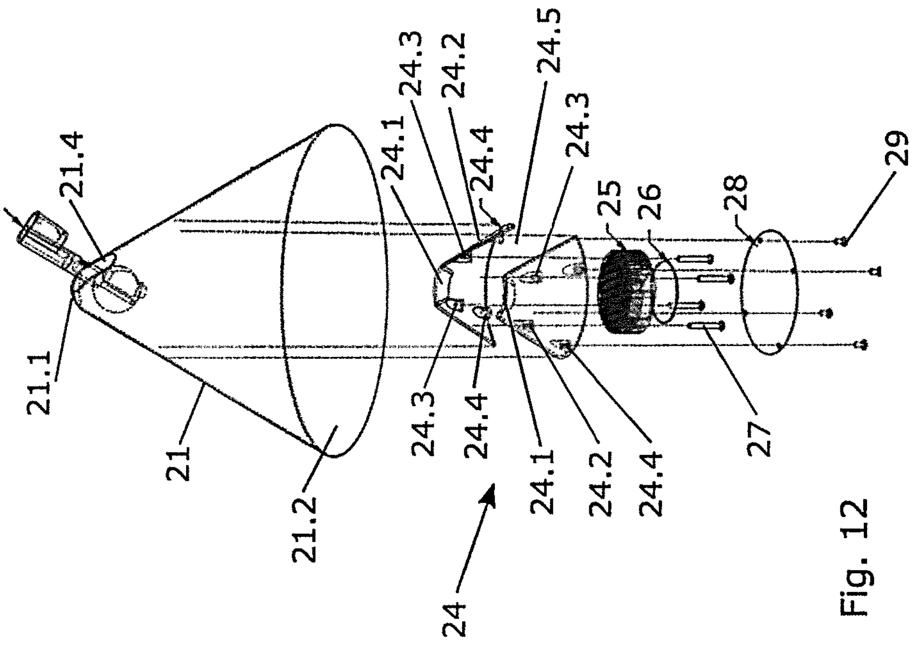
Figure 11:
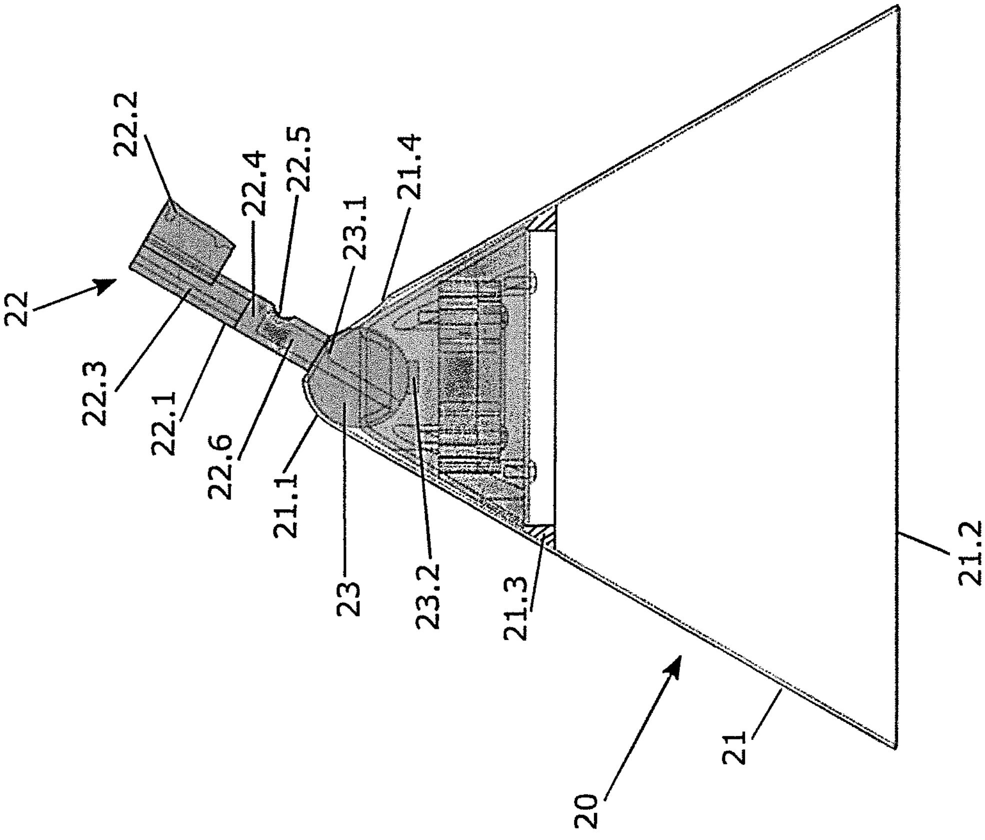
Figure 14:
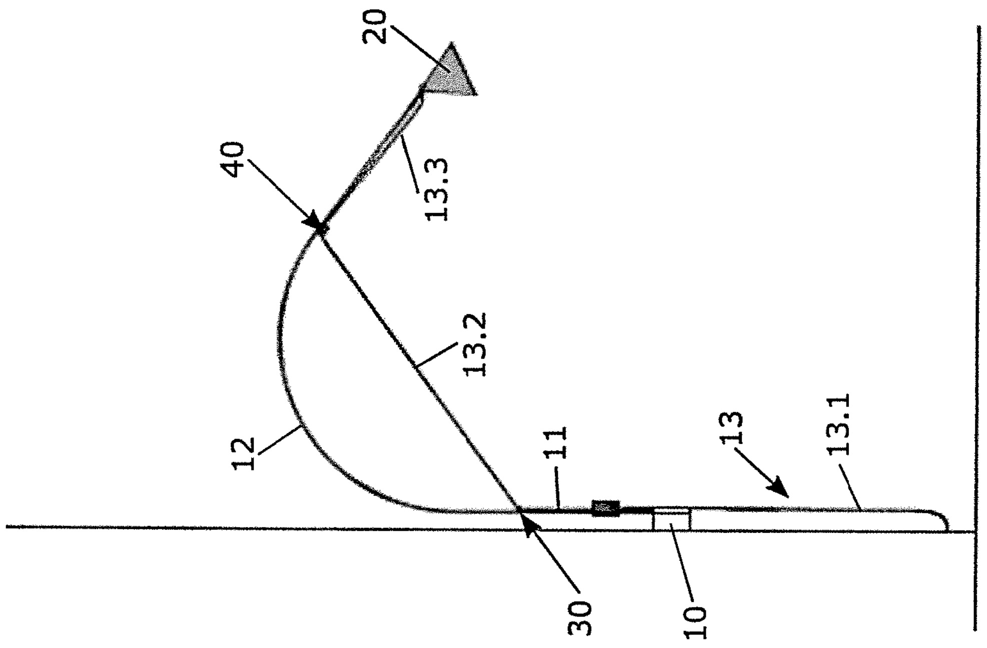
Figure 13:
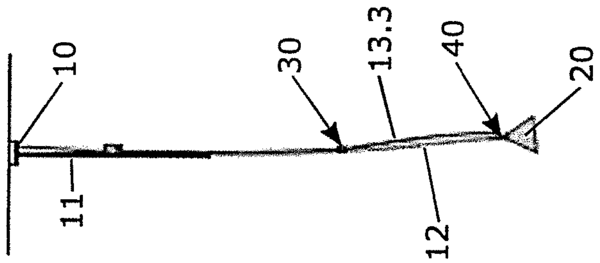
Figure 17:
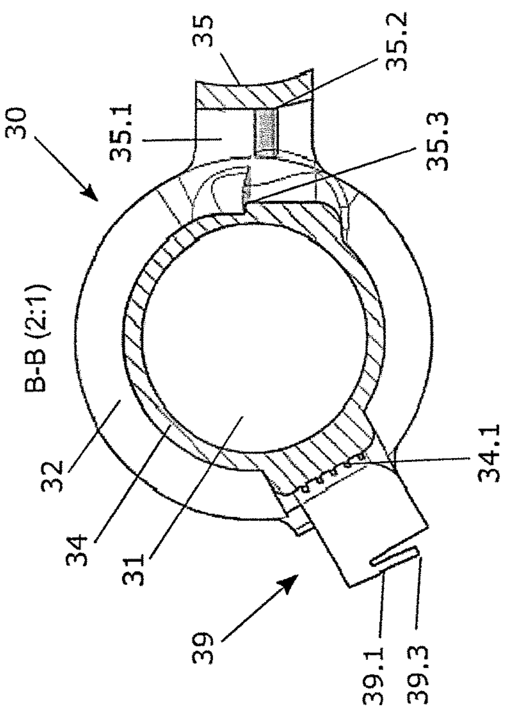
Figure 16:
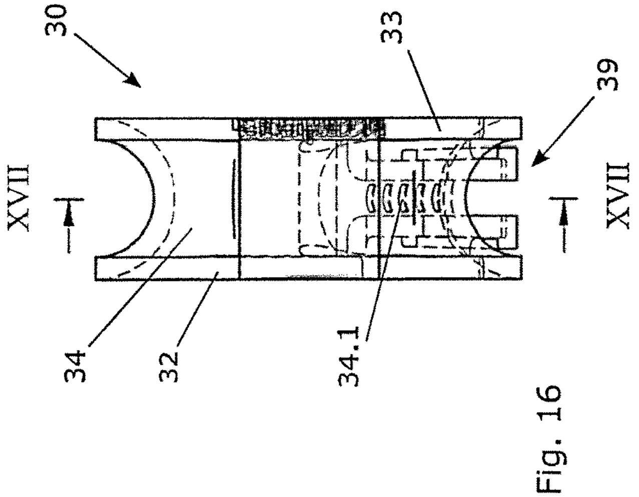
Figure 15:
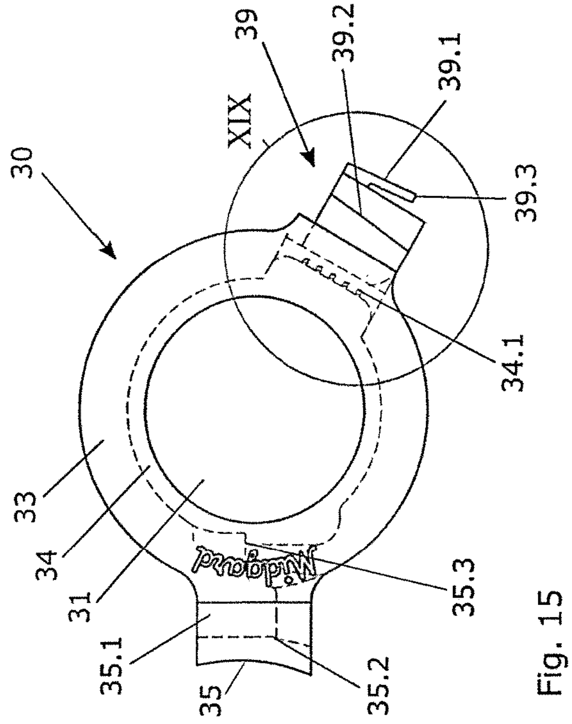
Figure 21:
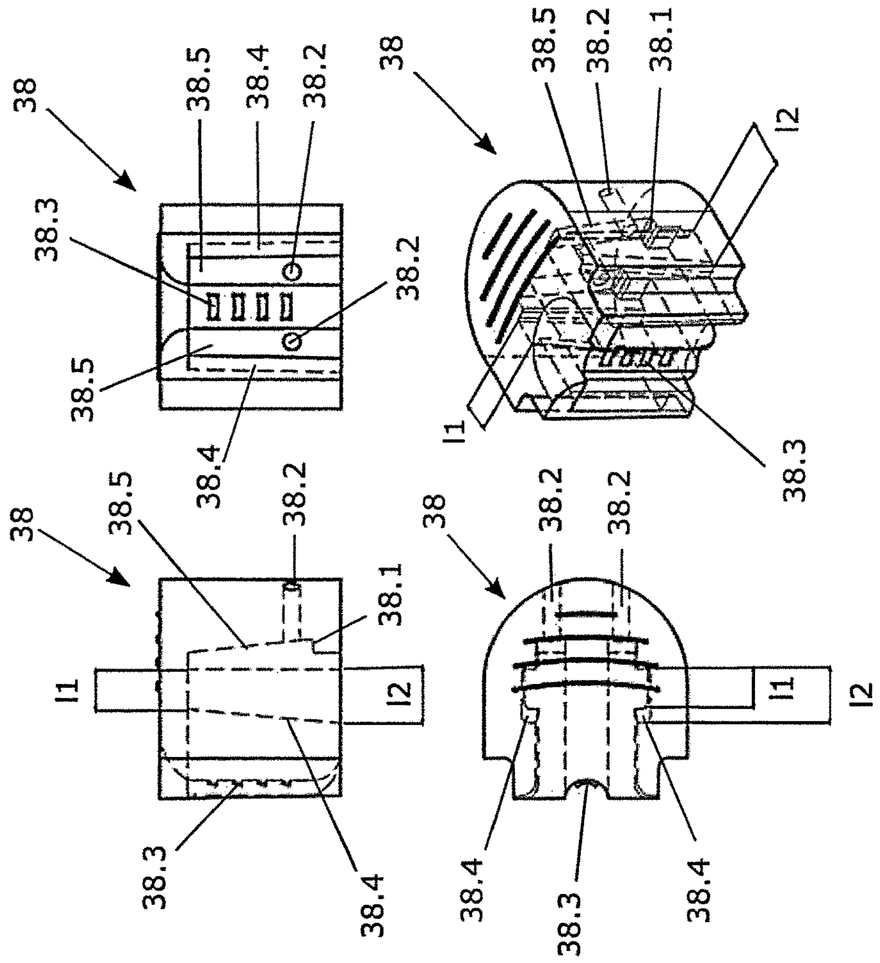
Figure 18:
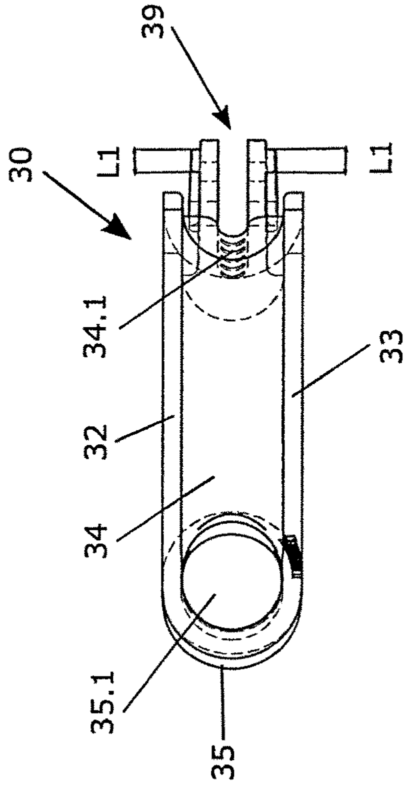
Figure 19:
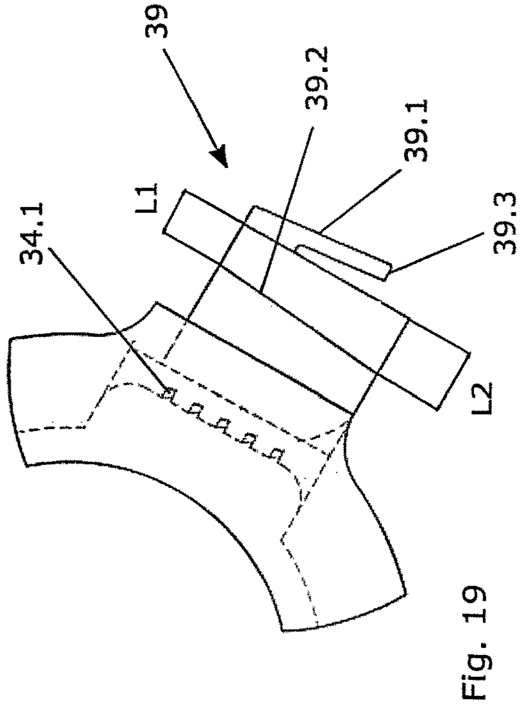
Figure 22:
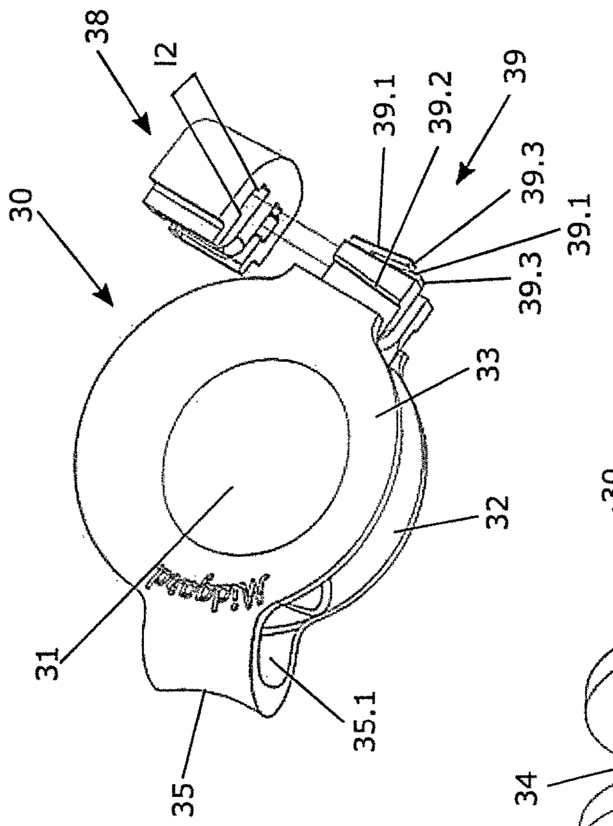
Figure 23:
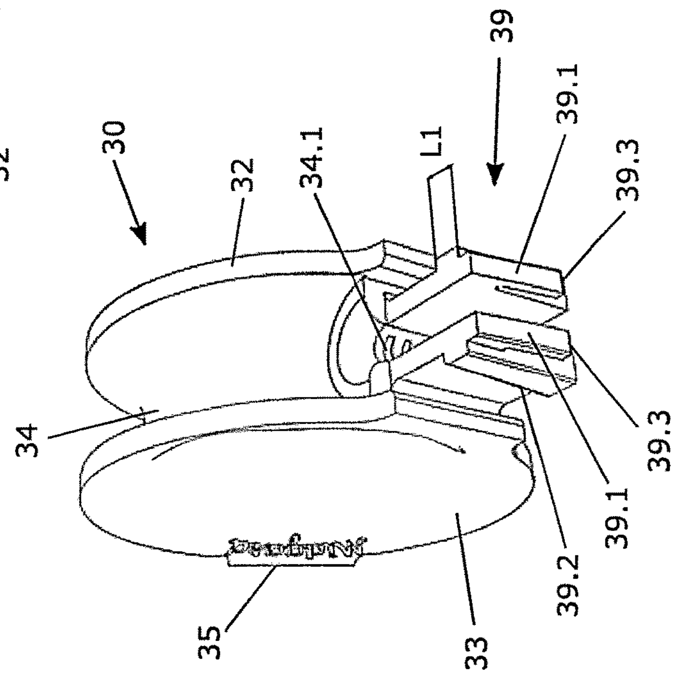
Figure 20:
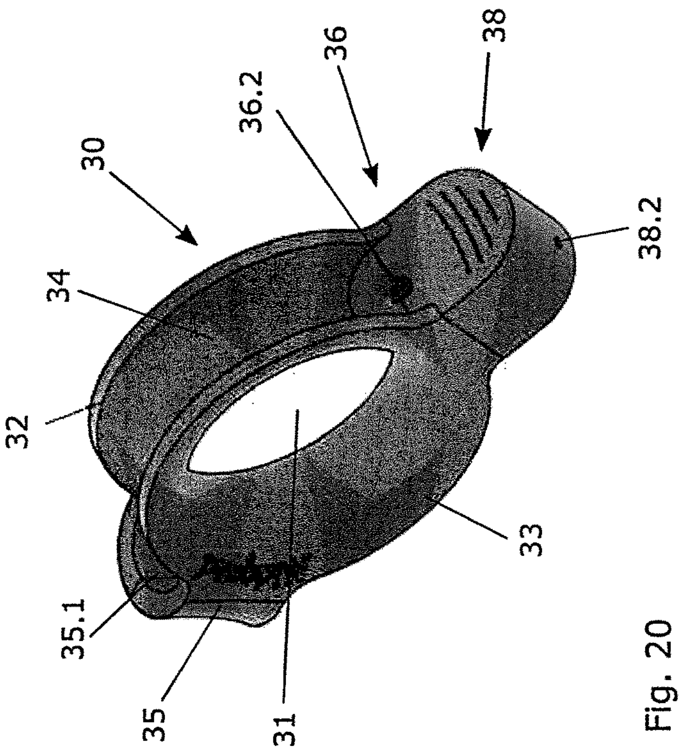
Figure 25:
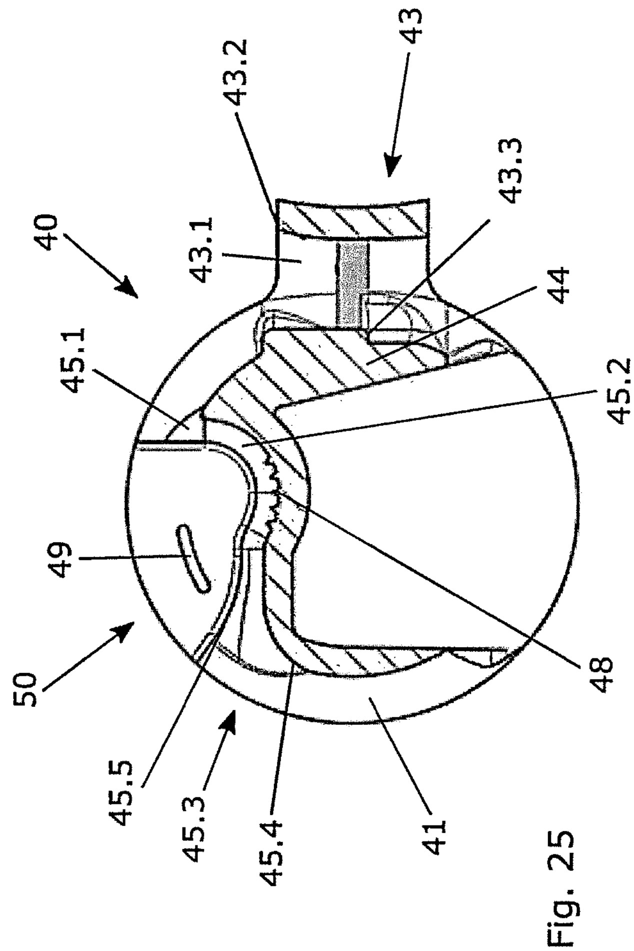
Figure 26:
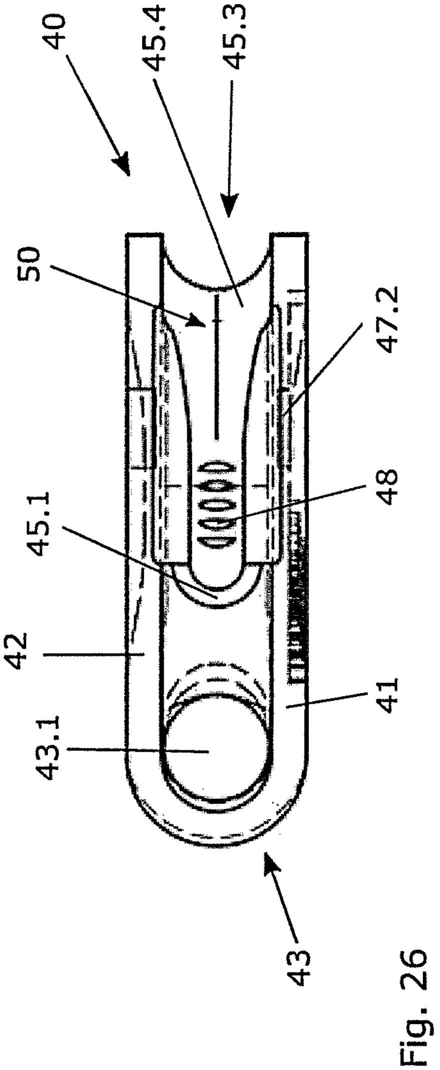
Figure 24:
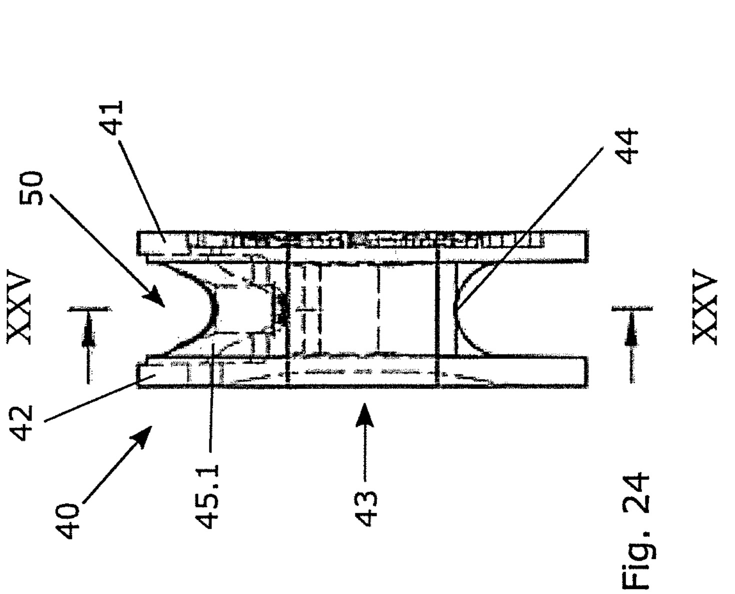
Figure 28:
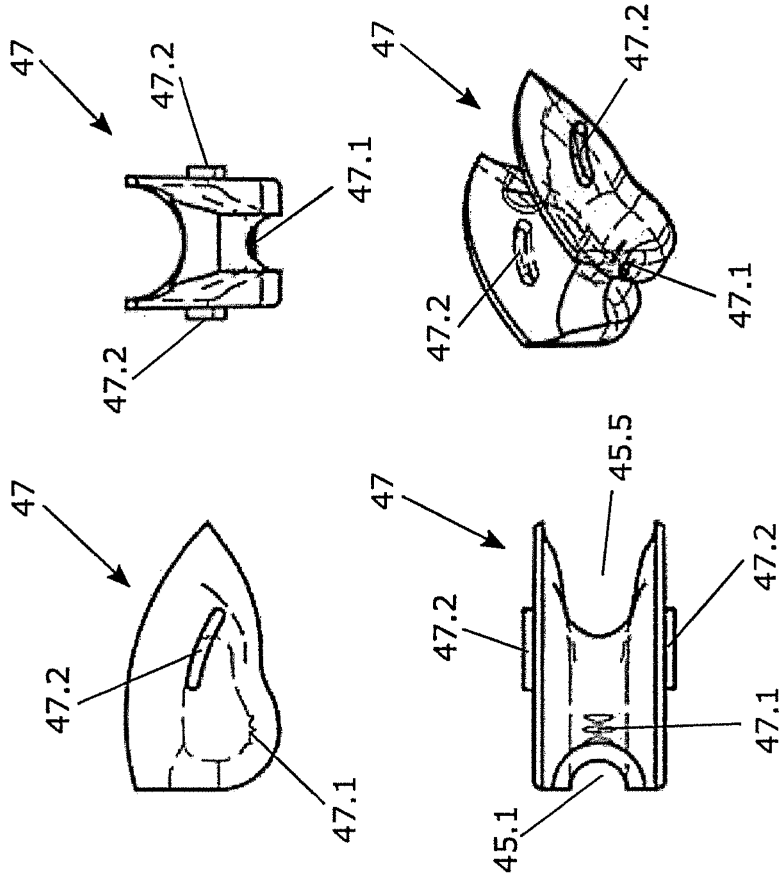
Figure 27:
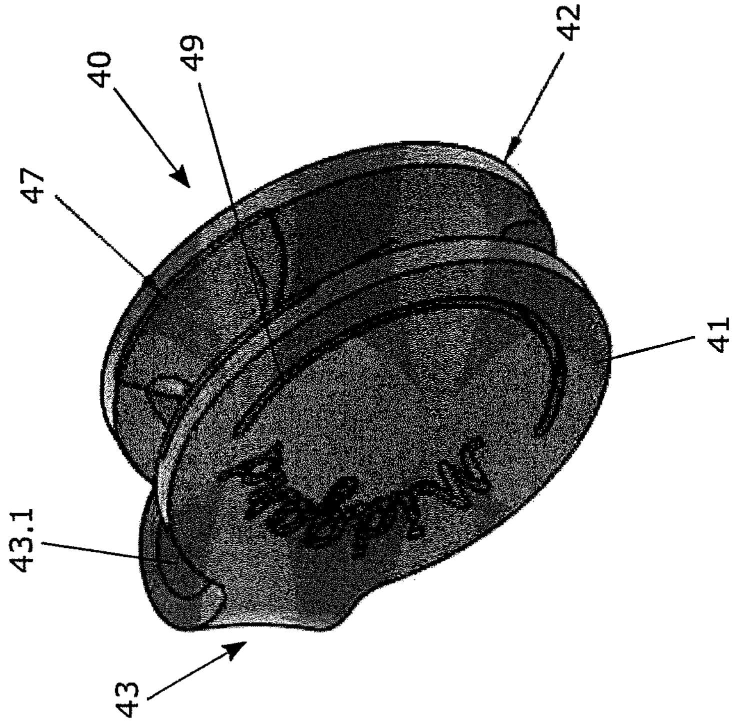
Figure 31:
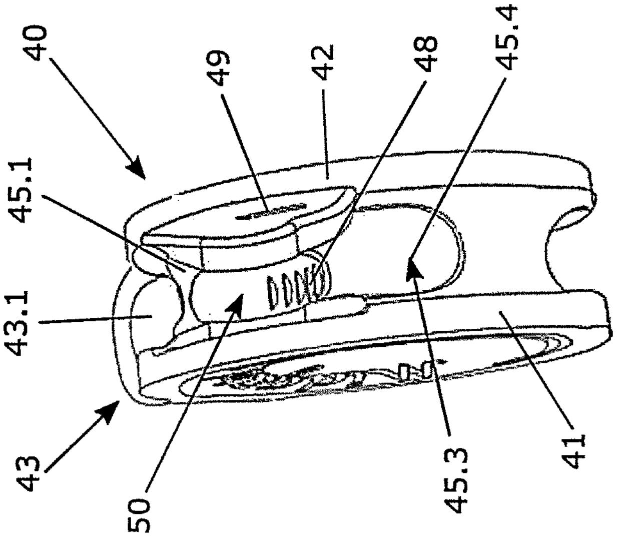
Figure 30:
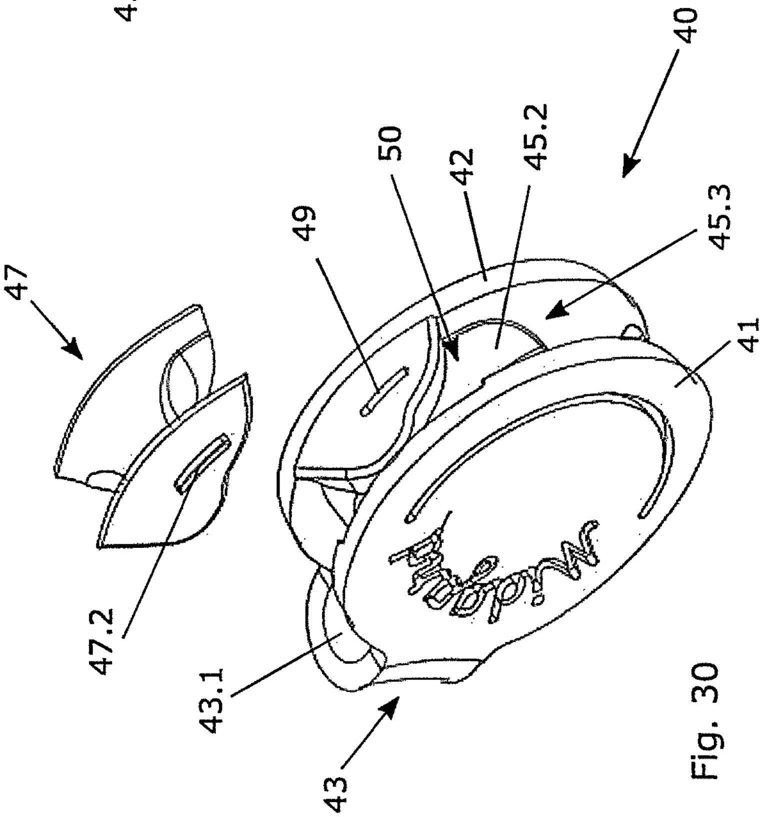
Figure 29:
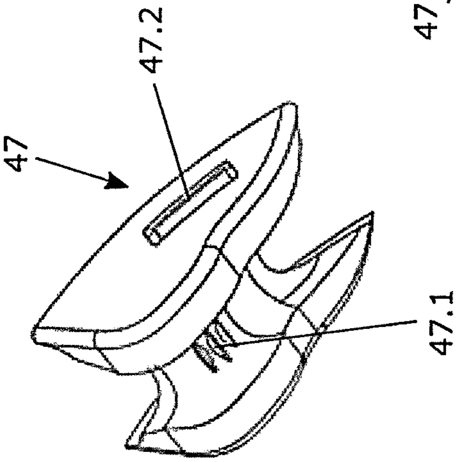

The invention is explained in greater detail below based on exemplary embodiments shown in the drawings. In the figures, FIGS. 1*a* to 1*d* show various functional positions of a luminaire according to the invention, FIGS. 2*a* to 2*e* show various functional positions of the luminaire of FIGS. 1*a* to 1*d*, FIG. 3 shows an exploded view of a part of the luminaire of FIGS. 1A to 2*e*, FIG. 4 shows a side view of the adjusting element shown in FIG. 3, FIG. 5 shows the adjusting element of FIG. 4 after assembly, FIG. 6 shows the representation of FIG. 3 in the assembled state, FIG. 7 shows an exploded view of a part of the luminaire of FIGS. 1*a* to 2*e*, FIG. 8 shows a side view of the adjusting element shown in FIG. 7, FIG. 9 shows a top view of the adjusting element of FIG. 8, FIG. 10 shows the representation of FIG. 7 in the assembled state, FIG. 11 shows a full section of a light unit, FIG. 12 shows an exploded view of the light unit of FIG. 11, FIG. 13 shows a further design variant of a luminaire designed as a ceiling luminaire, FIG. 14 shows a further design variant of a luminaire designed as a wall luminaire, FIG. 15 shows a side view of a further variant of the adjusting element of a luminaire shown in FIG. 4, FIG. 16 shows a further side view of the adjusting element of FIG. 15, FIG. 17 shows a further side view and sectional view of the adjusting element of FIG. 16 cut away along the line XVII-XVII, FIG. 18 shows a top view of the adjusting element of FIG. 15, FIG. 19 shows a detail view XIX of FIG. 15 of a first adjusting element of a luminaire, FIG. 20 shows an isometric representation of the adjusting element of FIG. 15, FIG. 21 shows different views of the adjusting element of FIG. 20, FIG. 22 shows an exploded view of the adjusting element of FIG. 20, FIG. 23 shows an isometric representation of the adjusting element of FIG. 15/of FIG. 20 without clamp, FIG. 24 shows a side view of a further variant of the adjusting element of a luminaire shown in FIG. 8, FIG. 25 shows a further side view and sectional view of the adjusting element of FIG. 24 cut away along the line XXV-XXV, FIG. 26 shows a top view of the adjusting element of FIG. 25, FIG. 27 shows an isometric representation of the adjusting element of FIG. 25, FIG. 28 shows different views of the clamp of the adjusting element of FIG. 27, FIG. 29 shows a perspective view of clamp of the adjusting element separator of FIG. 28, FIG. 30 shows an exploded view of the adjusting element of FIG. 27, FIG. 31 shows an isometric representation of the adjusting element of FIG. 25/of FIG. 27 without clamp.

FIGS. 1*a* to 2*e* show a design variant of a luminaire according to the invention. As the drawings shows, the luminaire has a stand 10. A support 11 is installed to the stand 10. The luminaire may also be referred to as a lamp.

In a luminaire according to the invention, the support 11 may be formed by a hollow section. In particular, as in this exemplary embodiment, the support 11 may have a circular cross-section. If a hollow section is used, an annular cross-section may be provided.

In this exemplary embodiment, the support 11 has an annular cross-section and is cut to length from a semi-finished product as a profiled section.

On the end facing the stand 10, a threaded rod is inserted into the area encompassed by the hollow section and attached here. For instance, the threaded rod can be pressed or connected to the support 11 by material bonding. A piece of the threaded rod is routed out of the longitudinal end of the support 11. This end piece of the threaded rod is used to screw the stand 10 to the support 11.

In the simplest case, the stand 10 may be formed by a plate-shaped workpiece. Preferably, the stand 10 is circular, wherein further preferably, the support 11 is attached in the area of the center of the circle. This provides a stable support, regardless of the operating position of the luminaire.

A holder 12 is connected to the support 11. The support 11 keeps the holder 12 spaced apart from the stand 10.

The holder 12 is formed like a bending rod. It may, for instance, be formed by a glass fiber reinforced plastic. Accordingly, the holder 12 exhibits elastic resetting behavior. After the holder 12 has been bent, it can spring back to its stretched original position due to its elastic resetting force.

Preferably, a round bar made of a solid material may be used as the holder 12. The holder can be made of a glass fiber reinforced plastic, for instance. Both long-fiber-reinforced and short-fiber-reinforced plastics are conceivable, wherein long-fiber-reinforced plastics are preferred due to their elastic stretchability.

A light unit 20 is attached to the end of the holder 12.

With reference to FIGS. 11 and 12, the design of the light unit 20 is first explained in more detail. As these illustrations shows, the light unit 20 has a lampshade 21. The lampshade 21 may be made of a molded part, preferably consisting of polycarbonate.

The lampshade 21 has a conical geometry, which has an opening 21.2 as a light outlet. Opposite from the opening 21.2, the lampshade forms a rounded termination. This rounded termination forms a bearing seat 21.1 in the space encompassed by the lampshade 21. This bearing seat 21.1 has the shape of a sphere.

An adjusting element 22 can be inserted into the lampshade 21 from the opening 21.2. The adjusting element 22 has a lever element 22.1. This lever element 22.1 is passed through a lead-through 21.4 of the lampshade 21.

A joint piece 23 is connected to the lever element 22.1, preferably integrally molded thereto. This joint piece 23 has a spherical or partially spherical contour. This contour is designed to fit the sphere of the lampshade 21. In this way, a swivel bearing is formed using the sphere of the lampshade 21 and the joint piece 23.

The lever element 22.1 has an attachment piece 22.2, which is held outside of the lampshade 21.

The lever element 22.1 may further comprise a plug-in mount 22.3. This plug-in mount 22.3 is designed as a recess. The plug-in mount 22.3 is delimited by a stop 22.4.

Furthermore, the lever element 22.1 has a cable bushing 22.5. This cable bushing 22.5 opens out into a cable duct 22.6. The cable duct 22.6 extends into the area of the joint piece 23. Thus, in the assembled state of the adjusting element 22, the cable duct 22.6 opens out into the area inside the lampshade 21. Accordingly, the cable duct 22.6 has a cable guide 23.1 in the area of the joint piece 23.

FIG. 12 shows that an illuminant holder 24 is installed in the lampshade 21. In this exemplary embodiment, the illuminant holder 24 is composed of two molded parts 24.1, which are of identical design and are disposed offset from one another by 180°. In the assembled state, the molded parts 24.1 form a uniform shell element.

Alternatively, provision may also be made for this shell element to be integrally formed. This reduces the number of parts required.

The illuminant holder 24 has two attachment levels, each formed by screw mounts 24.3, 24.4.

On its end facing the bearing seat 21.1 of the lampshade 21, the illuminant holder 24 has a bearing shell 24.1, which is formed by the molded parts 24.2 (or, in the case of an integrally formed illuminant holder 24, by the latter itself). The bearing shell 24.1 has the shape of a sphere. The geometry of this sphere is again designed to match the spherical geometry of the joint piece 23. In the assembled state, the joint piece 23 is secured between the spheres of the illuminant holder 24 and the bearing seat 21.1 of the lampshade 21 to form a swivel bearing.

To mount the illuminant holder 24, it is inserted through the opening 21.2 of the lampshade 21 and secured to an arrestor 21.3 of the lampshade 21. The arrestor 21.3 is disposed on the inside of the lampshade 21, for instance integrally formed. For instance, snap elements can be used as arrestors 21.3, which engage behind a snap flank of the illuminant holder 24 in the mounted state.

The light unit 20 has an illuminant 26. The illuminant 26 may also be referred to as a light source 26. This illuminant 26 may be an LED illuminant, for instance. For instance, a printed circuit board equipped with LED(s) can be used for this purpose. In this case, additionally provision may also be made for a heat sink 25 to be assigned to the LED illuminant. This heat sink 25 dissipates the heat loss from the LED illuminant.

The illuminant 26 can be inserted into the illuminant holder 24 through an opening 24.5 of the illuminant holder 24 facing the opening 21.2 of the lampshade 21, and can be attached to the screw mounts 24.3 forming the first attachment level. If an LED illuminant is used together with a heat sink 25, these assemblies can be jointly attached to the screw mounts 24.3 by means of the fastening screws 27.

As FIG. 12 indicates, a light diffuser can be installed with the illuminant holder 24 and is inserted into the light path of the illuminant 26. The light diffuser 28 can be screwed to the screw mounts 24.4, which form the second attachment level of the illuminant holder 24, by means of fastening screws 29.

When an LED illuminant is used in conjunction with a heat sink 25, the light diffuser 28 has or forms one or several air lead-throughs. Cooling air can be passed through these. The cooling air absorbs the thermal losses at the heat sink 25. The heated air leaves the lampshade 21 through the lead-through 21.4 of the lampshade 21. In this way, reliable and effective cooling can be ensured.

To mount the light unit 20 to the holder 12, the longitudinal end of the holder 12 is inserted into the plug-in mount 22.3 and attached therein, for instance using a clamping screw.

The end of the holder 12 facing away from the light unit 20 can be inserted into the cavity formed by the support 11, which has the form of a hollow profile, opposite from the stand 10. Preferably, provision may be made for the holder 12 to be loosely inserted in the hollow profile. This results in a rotary bearing having an axis of rotation that extends in the longitudinal direction of the support 11. The swivel bearing allows the holder 12 to be rotated relative to the support 11. Advantageously, a rotation angle limitation may be provided to prevent the holder 12 from being endlessly rotated relative to the support 11. This rotation option can be used to alter the positioning of the light unit 20.

An adjusting element 30 can be attached to the support 11. The design of the adjusting element 30 can be seen in more detail in FIGS. 4 to 6. As these illustrations show, the adjusting element 30 has a clamping section 34 that is laterally delimited by two guide elements 32, 33. FIG. 5 shows that the clamping section 34 has a concave shape. This concave geometry is designed to fit the outer cross section of the support 11. This permits the largest possible contact surface of the clamping section 34 with the outer cross-section of the support 11.

Furthermore, an integrally formed holding element holding element 35 is provided on the adjusting element 30. The holding element holding element 35 may have an eyelet-shaped geometry, as shown in the drawings. The holding element holding element 35 is penetrated by a mount 35.1. This mount 35.1 adjoins the clamping section 34. In this way, the mount 35.1 is delimited by the holding element 35 and the clamping section 34. Spaced apart from the holding element 35, the adjusting element 30 has an attachment section 36. The attachment section 36 has a lead-through 36.2 and a seat 36.3. The seat 36.3 adjoins the lead-through 36.2. An actuating element 36.1, for instance having a serrated actuating surface, can also be provided on the attachment section.

The adjusting element element 30 is penetrated by a grip hole 31 in the area between the holding element 35 and the attachment section 36.

As FIG. 3 indicates, the clamping section 34 may be occupied by a friction piece 37. This friction piece 37 may be designed like a rubber pad or a coating. The friction piece 37 increases the coefficient of friction between the support 11 and the adjusting element 30.

For assembly, the adjusting element 30 is pushed onto the support 11 on the end opposite from the stand 10. For this purpose, the mount 35.1 of the holding element 35 of the adjusting element 30 is threaded onto the support 11. In the assembled state shown in FIG. 6, the holding element 35 encompasses the outer circumference of the support 11. A part of the outer cross-section of the support 11 rests on the clamping section 34.

Furthermore, a floppy tension element can be connected to the adjusting element 30. This flexible tension element may be formed by a power cable 13, which is used to supply power to the illuminant 26. However, it is also conceivable that no power cable 13 is used, but another floppy tension element, for instance a rope. The floppy tension element has a tensioning section 13.2. A clamping piece 14 is put on this tensioning section 13.2. This clamping piece 14 is connected to the tensioning section 13.2 in an immovable manner. For instance, an aluminum sleeve can be used as clamping piece 14, which is pressed to the outer circumference of the tensioning section 13.2. The tensioning section 13.2 is secured to the adjusting element 30 by means of the clamping piece 14. For this purpose, the clamping element 13.2 is passed through the lead-through 36.2 of the attachment section 36 until the clamping piece 14 comes to rest in the seat 36.3. For instance, provision may be made for the clamping piece 14 to be pressed into the lead-through 36.2 with a slight interference.

If a power cable 13 is used, a line section 13.1 is connected to the tensioning section 13.2 of the power cable 13. A connector element for a socket can be installed at the end of this line section 13.1.

A second adjusting element 40 can be connected to the holder 12. The design of the second adjusting element 40 can be seen in FIGS. 7 to 10. As these illustrations show, the second adjusting element 40 is delimited by guide elements 41, 42 on opposite ends. These guide elements 41, 42 form gripping surfaces on their ends facing away from each other. Furthermore, the adjusting element 40 has a retaining piece 43. This retaining piece 43 can be sleeve-shaped and have a mount 43.1 designed as a lead-through. Further, a clamping section 44 is provided, which is delimited by the two guide elements 41, 42. The clamping section 44 is covered by the retaining piece 43 in the area of the mount 43.1. Thus, the mount 43.1 is delimited by the retaining piece 43 and the clamping section 44. Similar to the adjusting element 30, the adjusting element 40 may also use a friction piece 46. This friction piece 46 may be formed as a rubber element or a coating. The friction piece is used to increase the friction between the holder 12 and the second adjusting element 40 in the area of the mount 43.1.

FIG. 8 shows that the second adjusting element 40 has a tension element guide 45. This tension element guide 45 has an attachment section 45.1. The attachment section 45.1 is transitioned into a deflection area 45.2. Adjacent to the deflection area 45.2, the tension element guide 45 forms a guide area 45.3 with two spaced-apart contact areas 45.4 and 45.5 for the tensioning section 13.2 in different adjustment positions of the luminaire.

To mount the tensioning section 13.2 on the second adjusting element 40, the tensioning section 13.2, coming from the guide area 45.3, is threaded into the tension element guide 45. The clamping element 13.2 is then routed out of the tension element guide 45 in the area of the attachment section 45.1. Subsequently, another clamping piece 14 can be attached at the desired position of the tensioning section 13.2. This clamping device 14 is then connected to the tensioning section 13.2 in a fixed manner. Here again, a pressed aluminum sleeve can be used.

The maximum possible distance between the two adjusting elements 30 and 40 is determined by the two clamping pieces 14.

The second adjusting element 40 is mounted in such a way that the retaining piece 43 is used to thread this second adjusting element 40 onto a free end of the holder 12. The holder 12 then penetrates the retaining piece 43 in the area of the mount 43.1. The holder 12 is again in contact with the retaining piece 43 and the clamping section 44. FIG. 9 shows that the shape of the clamping section is concave, such that the contour of the friction piece 46 forming the clamping section 44 is adapted to the cylindrical outer contour of the holder 12.

As FIGS. 1*a* to 1*e* show, the power cable 13 is routed to the adjusting element 30 and secured there by means of the clamping piece 14. Adjacent to the first adjusting element 30, the power cable 13 forms the tensioning section 13.2. The tensioning section 13.2 is formed between the two clamping pieces 14 of the adjusting elements 30 and 40. Connected to the second adjusting element 40, the power cable 13 forms a line section 13.3. The end of this line section 13.3 is inserted through (see FIG. 11) the cable bushing 22.5 into the cable duct 22.6. In the area of the cable guide 23.1, the power cable 13 leaves the cable duct 22.6 and is then electrically connected at the illuminant 26. The power cable 13 can be attached to the attachment piece 22.2 with strain relief.

The operation of the luminaire described above is explained in more detail below with reference to FIGS. 1*a* to 2*e*. In FIG. 1*a*, the luminaire is in its initial state. The tensioning section 13.2 is not tensioned. The holder 12 is not in a preload state.

If the adjusting element 30 is gripped (for instance in the grip hole 31) and moved in the direction of the stand 10, the position of the second adjusting element 40 on the holder 12 remains unaltered. Due to the change in location of the first adjusting element 30, the holder 12 is bent elastically, as shown in FIG. 1*b*. The luminaire assumes a first operating position. Any automatic adjustment of the two adjusting elements 30, 40 in this position is prevented. In the first adjusting element 30, the attachment section 36 is spaced-apart from the holding element 35 and thus from the support 11. The tensile force, which is introduced into the tensioning section 13.2 via the spring tension of the holder 12, is transmitted into the attachment piece 36 via the clamping element 14. Because of the spacing of the attachment piece 36 from the holding element 35, a lever arm results. This lever arm tilts the adjusting element 30 with respect to the support 11, because a clearance is left between the outer contour of the support 11 and the inner circumference of the holding element 35 (mount 35.1). This tilting motion results in the friction locking of the adjusting element 30 described above.

In the same way, the second adjusting element 40 is frictionally locked to the holder 12. This is made possible by (see FIGS. 7 to 10) the tensioning section 13.2 being held spaced apart from the holder 12 by means of the second adjusting element 40 via the deflection area 45.2 and the associated deformation of the transition section 13.4 of the tensioning section 13.2. Because the tensioning section 13.2 now engages the adjusting element 40 spaced apart from the retaining piece 43, a moment of tilt is generated again. As a result of this moment of tilt, the second adjusting element 40 is tilted relative to the holder 12 in the mount 43.1, which causes the second adjusting element 40 to be frictionally clamped to the holder 12.

If now, starting from FIG. 1*b*, the first adjusting element 30 is moved further towards the stand 10 on the support 11, then the arcuate shape of the section of the holder 12, which is formed by the tensioning section 13.2, is altered. This can be clearly seen in the sequence of figures shown in FIGS. 1*a* to 1*d*. This also alters the position and orientation of the light unit 20.

FIGS. 1*a* to 1*d* also clearly show that the area of the holder 12 between the adjusting element 40 and the light unit 20 is not bent. Accordingly, this area remains undeformed (except for the deformation caused by the dead weight of the light unit 20).

The sequence of figures shown in FIGS. 2*a* to 2*e* illustrates further adjustment options. In the representation according to FIG. 2*a*, the first adjusting element 30 is initially pulled a short distance in the direction of the stand 10. Based on this positioning, the second adjusting element 40 is now also moved in the direction of the light unit 20. The resulting arcuate shape of the holder 12 can be seen in FIG. 2*b*.

Figure 2E:
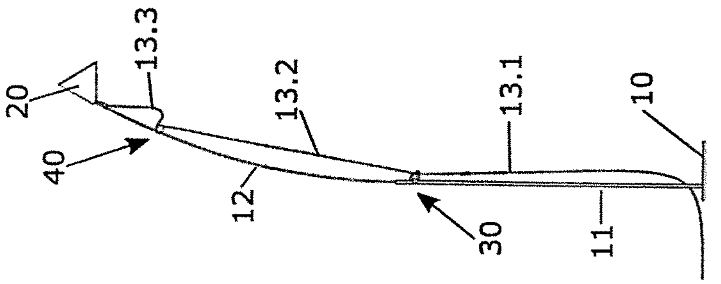
Figure 2D:
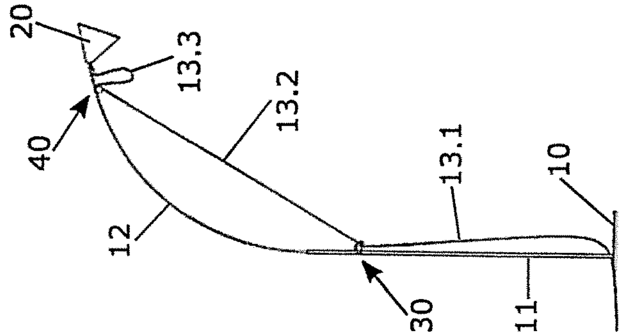
Figure 2C:
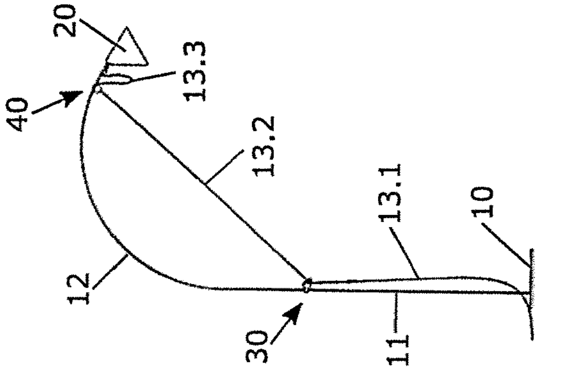
Figure 2B:
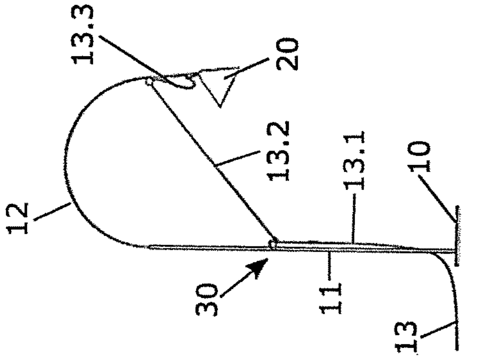
Figure 2A:
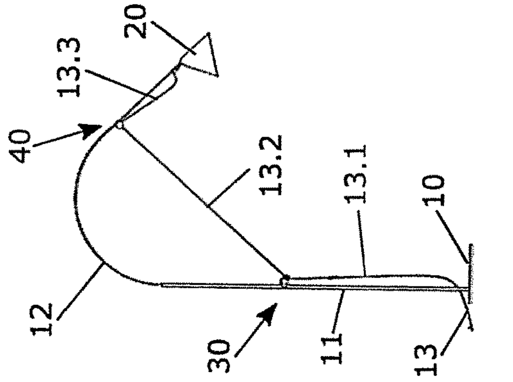

The illustration according to FIGS. 2*c* and 2*d* show the influence that results when the second adjusting element 40 has been moved to close to the light unit 20 and then an offset of the first adjusting element 30 is performed.

FIG. 2 shows a position, in which the first adjusting element 30 has been pushed almost to the end of the support 11 and the second adjusting element 40 has been moved a small distance towards the light unit 20.

In the various positions of the adjusting elements 30, 40, the positioning of the lampshade 21 can additionally be altered by swiveling the lampshade 21 relative to the adjusting element 22. This expands the number of adjustment options.

The securing of the adjusting elements 30 and 40 to the support 11 and the holder 12, respectively, can be easily released. At the first adjusting element 30, the user grips the adjusting element 30, for instance by putting a finger through the grip hole 31. When moving the adjusting element 30 towards the stand 10, the user only has to pull the adjusting element 30 downwards. However, if the user now wishes to move the first adjusting element 30 away from the stand 10, the user can first swivel the adjusting element 30 relative to the support 11 to release the clamping caused by the moment of tilt. To this end, the user can, for instance, reach through the grip hole 31 and additionally press on the actuating element 36.1. If the clamping of the adjusting element 30 is now released, it can move the adjusting element 30 in the direction away from the stand 10 supported by the tensile force of the tensioning section 13.2.

Similarly, the clamping of the second adjusting element 40 can be released. The user grips the second adjusting element 40 on the outside gripping surfaces of the guide elements 41, 42 and releases the clamping caused by the moment of tilt by applying a force against the tensile force of the tensioning section 13.2. The user can then either move the second adjusting element towards the light unit 20 against the clamping force of the tensioning section 13.2. Alternatively, the user can also move the second adjusting element 40 in the direction opposite from the light unit 20 supported by the clamping force of the tensioning section 13.2.

FIGS. 13 and 14 show alternative designs of a luminaire according to the invention. As these illustrations show, the stand 10 does not necessarily have to be designed as a stand for placement on the floor. Rather, the stand 10 can also be used as an attachment section for attaching the luminaire to a ceiling (see FIG. 13) or to a wall (see FIG. 14). In other respects, the design of the luminaires according to FIGS. 13 and 14 matches the design described above, which was explained with reference to FIGS. 1 to 12. In this respect, reference can be made to the above statements to avoid repetitions.

Within the scope of the invention, provision may be made for the support 11 to be manufactured of a flexurally rigid material. A sufficiently stiff steel material is preferably suitable for this purpose. For instance, a chromium-molybdenum steel or a stainless steel can be used.

Within the scope of the invention, provision can also be made in particular for the outer diameter of the holder to be in a range from 4 mm to 12 mm. Such holders can be deformed with acceptable forces to form the curved shape according to the invention, especially if a solid material made of glass fiber reinforced plastic is used for the holder.

Within the scope of the invention, further provision may be made for the outer diameter or maximum outer cross-sectional dimension of the support 11 to be 8 to 16 mm. Preferably, the wall thickness of the support 11, if it is designed as a hollow section having an annular cross-section, is at least 1.5 mm. This results in sufficient stiffness for common applications.

The luminaires described with reference to the preceding drawings allow the holder 12 to be rotated with respect to the support 11, and specifically about the central longitudinal axis of the support 11. Furthermore, the adjusting elements 30 and 40 can also be rotated relative to the support 11 and the holder 12 about the longitudinal axes of the support 11 and the holder 12, respectively. This provides additional positioning options for the luminaire.

FIGS. 15 to 19 show various views of the first adjusting element 30, including sectional views. The first adjusting element 30 is shown in a disassembled state, without a clamp, to illustrate the design of the mounting element 39.

FIG. 15 shows an alternative embodiment of the holding element 35 and the mounting element 39 of the first adjusting element 30 according to the invention. The holding element 35 adjoins the guide element 33 and the clamping section 34 and is preferably integrally formed therewith. The mount 35.1 of the holding element 35 also has a first edge 35.2 and a second edge 35.3. FIG. 17 shows the detailed design of the first and second edges 35.2, 35.3. The mounting element 39 also adjoins the guide element 33 and the clamping section 34 and is preferably integrally formed therewith. In the area of the mounting element 39, the clamping section 34 is radially wider and provides ribs 34.1. The mounting element 39 protrudes starting from the clamping section 34. The mounting element 39 further includes an elastic snap lug 39.1 having a tip of the snap lug 39.3, which is preferably oriented in the direction of the longitudinal extent of the bridge of the lug tangentially to the circular shape of the clamping section 34 or also to the guide element 33 and is preferably integrally formed on the mounting element 39. In addition, the mount 39 may form an inclined guide surface 39.2 by means of a shoulder, wherein the inclined guide surface 39.2 may likewise be oriented tangentially with respect to the clamping section 34 or the guide element 33.

With regard to the assembly of the clamp 38, shown in FIG. 21, the mounting element 39 receives the clamp 38 guided across the inclined guide surface 39.2, while the floppy tension element is located between the mounting element 39 and the clamp 38. The bridge of the lug of the spring-loaded snap lug 39.1 is pressed against the mounting element 39 from the end of the clamp 38 until the clamp 38 reaches the end position and the tip of the snap lug 39.3 snaps in accordingly. To do so, the clamp 38 is preferably pushed on from above. In the assembled state, the floppy tension element rests against the ribs 34.1 to provide additional support.

FIGS. 16 and 18 show a top view of the first adjusting element 30. In FIG. 16, the first adjusting element 30 is rotated in such a way that the tip of the snap lug 39.3 and thus the mounting element 39 is visible from below.

FIG. 18 shows the mounting element 39 from above, thus the bridge of the snap lug of the snap lug 39.1 can be seen. This perspective clearly shows that the mounting element 39 has an indentation in the central section XVII, see FIG. 16, which forms two legs. Two snap lugs 39.1 are assigned to the two legs. The two legs of the mounting element 39 engage with the two snap lugs 39.1 in the clamp 38 during assembly. In the context of the invention, the number of legs and snaps 39.1 is not limited to two. The provision of only one leg having a snap lug 39.1 or a plurality and a correspondingly fitting clamp 38 is conceivable.

FIG. 18, in particular FIG. 19, shows the design of the inclined guide surface 39.2. FIG. 19 shows a detailed view of detail XIX identified in FIG. 15. The gradient of the inclined guide surface 39.2 is defined by the length ratio of the first and second clamping lengths L1, L2. The first clamping length L1 is formed at the edge of the mounting element 39, which is spaced closer to the tensioning section 13.2 of the floppy tension element and is oriented transversely to the longitudinal extent of the floppy tension element. In this case, the first clamping length L1 preferably starts at the end of the mounting element 39 that faces away from the clamping section 34. In contrast to the first clamping length L1, the second clamping length L2 is formed at the edge of the mounting element, which is spaced closer to the line section 13.1 of the floppy tension element. The second clamping length L2 is also oriented transverse to the longitudinal extent of the floppy tension element. Likewise, the second clamping length L2 preferably starts at the end of the mounting element 39 facing away from the clamping section 34. In a preferred embodiment, the second clamping length L2 is longer than the first clamping length L1, wherein the clamping lengths L1, L2 attach to the mounting element 39 from the end facing the snap lug 39.1 preferably at the same height and extend in the direction of the clamping section 34. This creates a positive gradient that results in a continuous cross-sectional narrowing of the first attachment section 36 when the clamp 38 is installed. Due to the continuous narrowing of the cross-section, the force to be transmitted is increasingly stepped up and the hold of the floppy tension element in the first attachment section 36 is optimized.

FIG. 21 shows various different views of the clamp 38. The clamp 38 has a section at which ribs 38.3 may be provided. Preferably, these extend radially along the surface of the attachment section 36 and are spaced apart in the axial direction.

In the assembled position, the ribs 38.3 are located opposite from the ribs 34.1 of the mounting element 39, thus reinforcing the hold of the floppy tension element located in the first attachment section 36.

The clamp 38 can be further characterized in that it has an inclined guide surface 38.4 with precision of fit with respect to the inclined guide surface 39.2, which ensures continuous guidance and cross-sectional narrowing of the first attachment section 36. A first and a second clamping length 11, 12 describe the geometric dimensions of the bulge that is recessed into the clamp 38 to be received by the mounting element 39. The undercut formed in that way is readily apparent in the isometric view of clamp 38 in FIG. 22. To implement an identical gradient of the inclined guide surfaces 39.2, 38.4, the first clamping length L1 of the mounting element 39 can correspond to the first clamping length 11 of the clamp 38. Similarly, the linear dimension of the second clamping length L2 of the mounting element 39 may be equal to the linear dimension of the second clamping length 12 of the clamp 38.

The side view in FIG. 21 shows the snap flank 38.1, on which the tip of the snap lug 39.3 of the mounting element 39 rests in the snap position. There, the bridge of the snap lug rests against the contact section 38.5.

The clamp 38.2 can be used to disassemble the clamp 38. For this purpose, the snap lug 39.1 can be pressed off the snap flank 38.1 in a simple manner by the force exerted by an object of the same fit, which is pushed through the aperture 38.2 until it meets the snap lug 39.1. The snap lug 39.1 disengages and can be disassembled by guiding the inclined guide surfaces 39.2, 38.5.

A possible design of the holding element 35 is shown in FIG. 17. The holding element 35 receives the support 11 by means of the holder 35.1. The mount 35.1 provides for a first and a second edge 35.2, 35.3. The second edge 35.3 is disposed on the clamping section 34 spaced apart from the first edge 35.2 in the direction of the longitudinal extent of the profile section, wherein in the clamped state the second edge 35.3 is disposed on opposite ends of the profile section with respect to the first edge 35.2. Along the contour of the clamping section 34, the second edge 35.3 may be formed by a shoulder formed by an excess of material of the clamping section 34. The excess material is formed, for instance, on the end facing the clamping section 34, the support 11, and forms a shoulder at the level of the holding element 35, which extends from the excess material to the radius of the clamping section 34.

The first edge 35.2 may be formed by a shoulder along the contour of the mount 35.1. In a preferred embodiment, the first edge 35.2 is disposed along the longitudinal extent of the profile section in front of the second edge 35.3.

For assembly, the first adjusting element 30 is first pushed onto the support 11. As soon as the tensioning section 13.2 of the floppy tension element is tensioned, a force is introduced into the attachment section 36, which tilts the first adjusting element 30 relative to the holder 12. Thus, via the force introduced into the attachment section 36 and via the lever arm of the spaced-apart clamping section 34, a moment of tilt is introduced into the adjusting element 30, which automatically secures the adjusting element 30 to the profile section. Tilting alters the position of the support 11 within the intended clearance such that it rests on the first and second edges 35.2, 35.3. With the support 11 tilted in the mount 35.1, it rests on the first and second edges 35.2, 35.3, creating a self-locking clamping effect. Therefore, by providing the first and second edges 35.2, 35.3 in the manner described, securing can be optimized.

FIG. 20 shows the first adjusting element 30 in the assembled state, without the support 11 and the floppy tension element. FIGS. 22 and 23 show the first adjusting element 30 in a disassembled state.

FIG. 22 shows an exploded view of the mounting direction of the clamp 38 towards the mounting element 39. Accordingly, the clamp 38 is pushed onto the mounting element 39 as shown by the auxiliary lines.

FIG. 23 shows an isometric view of the first adjusting element 30 without the clamp 38. In this way, the shape of the mounting element 39 can be seen particularly well. In particular, the formations of the legs and the integrally formed snap lugs 39.1 of the mounting element 39 can be clearly seen. Likewise, it can be clearly seen in this view that the legs are integrally connected to the clamping section 34 and are adjacent to the guide section 33.

FIGS. 24 to 26 show various views and sectional views of the second adjusting element 40.

As can be seen in FIG. 24, the second adjusting element 40 has a mounting area 50 into which a clamp 47 can be inserted. The mounting area 50 is formed by a recess of the clamping section 44 and is adjacent to the guide element 41, 42. The second attachment section 45.1 may match the clearance between the mounting area 50 and the clamp 47 inserted into the mounting area 50.

FIG. 25 shows a section XXV of the second adjusting element 40. In one embodiment according to the invention, the mounting area 50 has a mounting section 45.1 followed by a deflection area 45.2 and a guide area 45.3. Furthermore, two contact areas 45.4, 45.5 can be provided. The deflection area 45.2 provides ribs 48, which are formed to protrude and are spaced apart from each other. In the assembled state, the floppy tension element extends along the second attachment section 45.1 and thus also along the deflection area 45.2, the guide area 45.3 and along one of the contact areas 45.4, 45.5. The deflection area 45.2 deflects the forces generated by clamping the floppy tension element in the second attachment section 45.1.

The mounting area 50 may have a molded mount 49. In addition, FIG. 25 illustrates the design of the retaining piece 43. The retaining piece 43 can be sleeve-shaped, as in the variant already presented, and form a mount 43.1 designed as a lead-through. The lead-through of the mount 43.1 is designed in such a way that the retaining piece 43 and the contour of the mount 43.1 form a first edge 43.2. The first edge 43.2 is disposed at the end of the mount 43.1 facing the light unit 20. The second edge 43.3 is disposed at the clamping section 44 spaced apart from the first edge 43.2 in the direction of the longitudinal extent of the profile section, wherein the second edge 43.3 is disposed on the opposite end of the profile section to the first edge 43.2 in the clamping state. In particular, the second edge 43.3 may be formed by a shoulder of the clamping section 44. In a preferred embodiment, the first edge 43.2 of the second actuating element 40 is disposed in the direction of the longitudinal extent of the holder 12 in the mount 43.1 and in the direction of the light unit 20 behind the second edge 43.3.

FIGS. 28 and 29 shows different views of the clamp 47. The clamp 47 can be a sectional fit to the mounting area 50. In particular, the clamp 47 has two legs which are connected by a bar. In the assembled state, the legs rest against the mounting area 50. The clamp 47 also provides ribs 47.1 in the area of the bar, thus in the area of the deflection, which are opposite from the ribs 48 of the mounting area 50. In the assembled state, the floppy tension element is tensioned and held between the mounting area 50 and the clamp 47. The ribs 47.1, 48 in the deflection section 45.2 can be used to reinforce the hold of the floppy tension element in the second attachment section 45.1. In addition, engagement elements 47.2 are disposed on the outer face of the legs, which engage in the molded mount 49 of the mounting area 50 in the assembled state.

To mount the holder 12 on the second adjusting element 40, the holder 12 is first pushed into the mount 43.1. As described above, the holder 12 is flexibly bent due to the change in position of the first adjusting element 30. Similar to the mechanism of the first adjusting element 30, as soon as the tensioning section 13.2 of the floppy tension element is tensioned, a force is applied to the attachment section 45.1, which tilts the second adjusting element 40 relative to the holder 12. Thus, via the force introduced into the attachment section 45.1 and via the lever arm of the spaced-apart clamping section 44, a moment of tilt is introduced into the second adjusting element 40, which automatically secures the adjusting element 40 to the profile section. By tilting the holder 12 in the mount 43.1, the holder 12 rests on the first and second edges 43.2, 43.3, causing a clamping effect. Accordingly, the self-locking securing can be optimized by providing a first and second edge 43.2, 43.3 in the manner described.

FIG. 27 shows an isometric view of the second adjusting element 40 with the clamp 47 inserted. FIGS. 30 and 31 show an isometric view of the second adjusting element 40 without the clamp 47, wherein FIG. 30 shows an exploded view of the clamp 47. In the isometric view without the clamp 47, the guide area 45.3 and the curved-shaped contact area 45.4 are clearly visible. In particular, the contact area 45.4, 45.5 provides free space for the floppy tension element and prevents kinking of the floppy tension element due to the rounded and/or a continuously widening shape of the mount 43.1.

The invention claimed is:

1. A lamp, comprising:

a stand;

a support attached directly or indirectly to the stand;

a holder attached directly or indirectly to the support;

a light unit including at least one light source, the light unit being attached directly or indirectly to the holder and facing away from the support;

a floppy tension element;

a first attachment section configured to couple the floppy tension element to the support or the holder;

a second attachment section configured to couple the floppy tension element to the holder or the light unit, the second attachment section being spaced-apart from the first attachment section;

wherein the floppy tension element includes a tensioning section extending between the first attachment section and the second attachment section; and wherein at least one of the first and second attachment sections is adjustably positioned by at least one adjusting element such that at least one area of the holder between the support and light unit is brought into an arcuate state or the arcuate state of the at least one area of the holder is altered.

2. The lamp of claim 1, wherein:

the first attachment section is adjustable in position along a length of the support or the holder and/or the second attachment section is adjustable in position along the length of the holder.

3. The lamp of claim 2, wherein:

the at least one adjusting element includes a first adjusting element and a second adjusting element;

the first attachment section is adjustably connected to the support by the first adjusting element; and the second attachment section is adjustably connected to the holder by the second adjusting element.

4. The lamp of claim 3, wherein:

the support includes a guide on which the first adjusting element is adjustably guided; and the holder includes a guide on which the second adjusting element is adjustably guided.

5. The lamp of claim 1, wherein:

the at least one adjusting element includes a holding element received over a profile of either the holder or the support so the at least one adjusting element can be displaced along a length of the holder or the support, the at least one adjusting element includes a clamping section which bears against the profile, and the at least one adjusting element includes the first or second attachment section held spaced apart from the clamping section to form a lever arm.

6. The lamp of claim 1, wherein:

at least one of the first and second attachment sections includes a mounting element and a clamp detachably connected to the mounting element.

7. The lamp of claim 6, wherein:

the mounting element includes an inclined guide surface and a flexible snap lug;

the clamp includes an inclined guide surface guided across the inclined guide surface of the mounting element; and in a snapped-in position a snap lug tip of the snap lug of the mounting element rests on a snap flank of the clamp.

8. The lamp of claim 6, wherein:

the mounting element includes an inclined guide surface having a gradient formed by first and second clamping lengths, the second clamping length being longer than the first clamping length, the first clamping length being located closer to the tensioning section of the floppy tension element than is the second clamping length.

9. The lamp of claim 6, wherein:

the mounting element includes a flexible snap lug;

the clamp includes a snap flank and a contact section;

in a snapped-in position a snap lug tip of the snap lug of the mounting element rests on the snap flank of the clamp and the snap lug rests on the contact section of the clamp; and the clamp includes an aperture extending from the contact section to an outer wall of the clamp.

10. The lamp of claim 6, wherein:

the clamp includes at least one engagement element configured to engage in a form-fitting manner with a molded mount of the mounting element.

11. The lamp of claim 1, wherein:

at least one of the first and second attachment sections includes ribs projecting in a direction of the floppy tension element.

12. The lamp of claim 1, wherein:

the at least one adjusting element includes a holding element received over a profile of either the holder or the support so the at least one adjusting element can be displaced along a length of the holder or the support;

the at least one adjusting element includes a clamping section which bears against the profile;

the holding element includes a first edge and a second edge, wherein the second edge is disposed at the clamping section spaced apart from the first edge in a direction of the length of the holder or the support; and the first edge and the second edge rest against opposite sides of the profile of the holder or the support in a clamped state.

13. The lamp of claim 12, wherein:

the first edge is formed by a shoulder of the holding element and/or the second edge is formed by a shoulder of the clamping section.

14. The lamp of claim 1, wherein:

the at least one adjusting element includes a holding element received over a profile of either the holder or the support so the at least one adjusting element can be displaced along a length of the holder or the support;

the at least one adjusting element includes two guide elements spaced apart from each other and a clamping section disposed between the two guide elements, the clamping section bearing against the profile of either the holder or the support, the clamping section being formed by a friction piece; and the profile of either the holder or the support is guided between the guide elements and rests on the clamping section.

15. The lamp of claim 1, wherein:

the at least one adjusting element is penetrated by a grip hole or has grip surfaces on two opposite outer faces.

16. The lamp of claim 1, further comprising:

a clamping piece secured to an outer circumference of the floppy tension element in a non-displaceable manner relative to a length of the floppy tension element, wherein the clamping piece is secured to one of the first and second attachment sections.

17. The lamp of claim 1, wherein:

the at least one adjusting element is penetrated by a tension element guide including a deflection area; and a transition section of the floppy tension element is received in the tension element guide and deflected in the deflection area.

18. The lamp of claim 1, wherein:

the floppy tension element is formed by a power cable electrically connected to the light unit.

19. The lamp of claim 1, wherein:

the support is formed by a hollow section having a longitudinal axis; and the holder is inserted in the hollow section in a manner such that the holder is rotatable relative to the hollow section about the longitudinal axis of the support.

20. The lamp of claim 1, wherein:

the holder is formed by a bending rod having a circular cross-section and made from a solid material.

21. The lamp of claim 1, wherein:

the holder is formed from a glass fiber reinforced plastic material.

22. The lamp of claim 1, wherein:

the light unit includes an attachment mount configured to receive an end of the holder.

23. The lamp of claim 1, wherein:

the light unit includes a swivel bearing configured to permit an angular position of the light unit relative to the holder to be altered.

* * * * *